(12) United States Patent
Medagam et al.

(10) Patent No.: US 12,267,023 B2
(45) Date of Patent: Apr. 1, 2025

(54) VOLTAGE DOUBLING ACTIVE SINGLE PHASE TO THREE-PHASE POWER CONVERTER

(71) Applicants: Peda V Medagam, Rapid City, SD (US); Jack Yang, Rapid City, SD (US)

(72) Inventors: Peda V Medagam, Rapid City, SD (US); Jack Yang, Rapid City, SD (US)

( * ) Notice: Subject to any disclaimer, the term of this patent is extended or adjusted under 35 U.S.C. 154(b) by 0 days.

(21) Appl. No.: 17/478,939

(22) Filed: Sep. 19, 2021

(65) Prior Publication Data
US 2023/0093417 A1    Mar. 23, 2023

(51) Int. Cl.
*H02M 5/458*    (2006.01)
*H02M 1/084*    (2006.01)

(52) U.S. Cl.
CPC ......... *H02M 5/4585* (2013.01); *H02M 1/084* (2013.01)

(58) Field of Classification Search
CPC .. H02M 5/4585; H02M 1/084; H02M 1/4233; H02M 5/293; H02M 7/217
See application file for complete search history.

(56) References Cited

U.S. PATENT DOCUMENTS

| | | | | |
|---|---|---|---|---|
| 6,118,676 A | * | 9/2000 | Divan | H02M 5/458 363/34 |
| 6,297,971 B1 | * | 10/2001 | Meiners | H02M 1/4233 363/36 |
| 9,203,321 B1 | * | 12/2015 | Xiong | H05B 45/3725 |
| 2017/0170743 A1 | * | 6/2017 | Medagam | H02M 5/4585 |

* cited by examiner

*Primary Examiner* — Emily P Pham

(57) ABSTRACT

A voltage doubling phase converter that converts single phase AC electric power to balanced three phase AC power. Two input terminals are connectable to a single-phase AC power source and connect directly to two output terminals of the converter. The phase converter has a storage capacitor, three active half-bridge modules connected to the storage capacitor, and a controller. Two modules connect to the input terminals and charge the storage capacitor. The other module connects to a third output terminal. The controller switches the module connected to the third output terminal and one of the other modules to generate and shape a second and a resultant third phase.

18 Claims, 2 Drawing Sheets

VOLTAGE DOUBLING ACTIVE SINGLE PHASE TO THREE-PHASE POWER CONVERTER

RELATED APPLICATIONS

This application is a continuation-in-part to U.S. patent application Ser. No. 17/181,168, filed Feb. 22, 2021, which is a continuation of U.S. patent application number 16/389,77, filed Apr. 19, 2019 and now U.S. Pat. No. 10,931,205, which is a continuation of U.S. patent application Ser. No. 15/798,102, filed Oct. 30, 2017, now U.S. Pat. No. 10,333,420 and entitled "Active Single Phase to Three Phase Power Converter,", all of which are incorporated herein by reference in their entirety.

TECHNICAL FIELD

The present invention relates to phase converters and more particularly to a phase converter for converting single-phase AC power to three-phase AC power.

BACKGROUND ART

Three-phase AC motors are generally more straightforward, more reliable, and more efficient than single-phase AC motors. In addition to three-phase AC motors, much high-power industrial equipment requires three-phase AC power. A load of such equipment can be inductive, capacitive, or resistive.

Three-phase AC power is generally supplied to industrial areas. However, only single-phase AC power is available to most residential and rural areas. The single-phase AC power available in most residential and rural areas is provided by a step-down transformer connected to a high voltage line and, in the United States, is normally supplied as about 240 volts at 60 Hz between the first and second input lines. Many three-phase induction motors are operated at a higher voltage, such as 460 volts, to reduce the current passing between the inverter of the variable frequency drive and the motor, thereby reducing the connecting cables' required size.

For areas where three-phase 480 VAC power is not available, various solutions have been used to convert single-phase 240V power to three-phase power 480V. For motor load applications, stepping up a transformer with static and rotary converters is one solution. These static and rotary converters, however, have a high percentage of voltage unbalance and low efficiency. Inverters, including AC drives, convert the entire single-phase AC input voltage into DC voltage, then invert the DC voltage into AC three-phase output voltage. Such inverters are generally more complex and expensive than static and rotary converters. The output voltages of such inverters consist of pulse-width-modulated (PWM) signals with high harmonic content so that the applications of these inverters are limited to inductive motor loads unless additional expensive filtering circuits are used.

U.S. Pat. No. 6,297,971 to Meiners discloses a digital phase converter that converts a single phase input voltage into a three-phase output voltage without converting the whole input AC voltage into DC voltage. The converter disclosed converts 240V AC single-phase voltage into balanced three-phase AC, and can be used for inductive, capacitive, and resistive loads with about 1% output voltage imbalance. U.S. Pat. No. 6,731,525 to Meiners discloses another digital phase converter that converts a single-phase input voltage into a three-phase output voltage without converting the whole input AC voltage into DC voltage.

SUMMARY OF THE INVENTION

A phase converter for converting single-phase AC power to a balanced three-phase power AC with voltage doubling feature includes (a) first and second single phase input terminals, (b) first, second and third three-phase output terminals, (c) a storage capacitor or capacitors, (d) an active half-bridge first, second, and second third modules, and (e) a controller. The first input terminal connects directly to the first output terminal The first, second, and third modules each have a positive terminal that connects to the positive end of the storage capacitor, a negative terminal that connects to the negative end of the storage capacitor, and an AC terminal. The AC terminal of the first module connects to the first input terminal, the AC terminal of the second module connects to the second input terminal, and the AC terminal of the third module connects to the third output terminal. The first, second, and third modules include first and second switches and first and second diodes. The controller connects to the first, second, and third modules, selectively driving the first and second switches of the first module to charge the storage capacitor and selectively driving the second and third modules to generate and shape a second phase and a resultant third phase relative to the single-phase power, to result in balanced three-phase AC power to the first, second and third output terminals.

Generally, the voltage doubling phase convertor accepts a single-phase input at an input voltage and converts it to a three-phase output with the voltage doubled. The voltage doubling phase convertor uses a controller to activate a set of solid-state switches to charge and discharge a pair of storage capacitors to generate the three-phase output. During operation, the pair of storage capacitors will be charge to a voltage about 3 times the input voltage. For example, if the input is single phase 240 volts, the output will be three phase 480 volts, but the storage capacitors of the voltage doubling phase convertor will be charge to about 720 volts.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
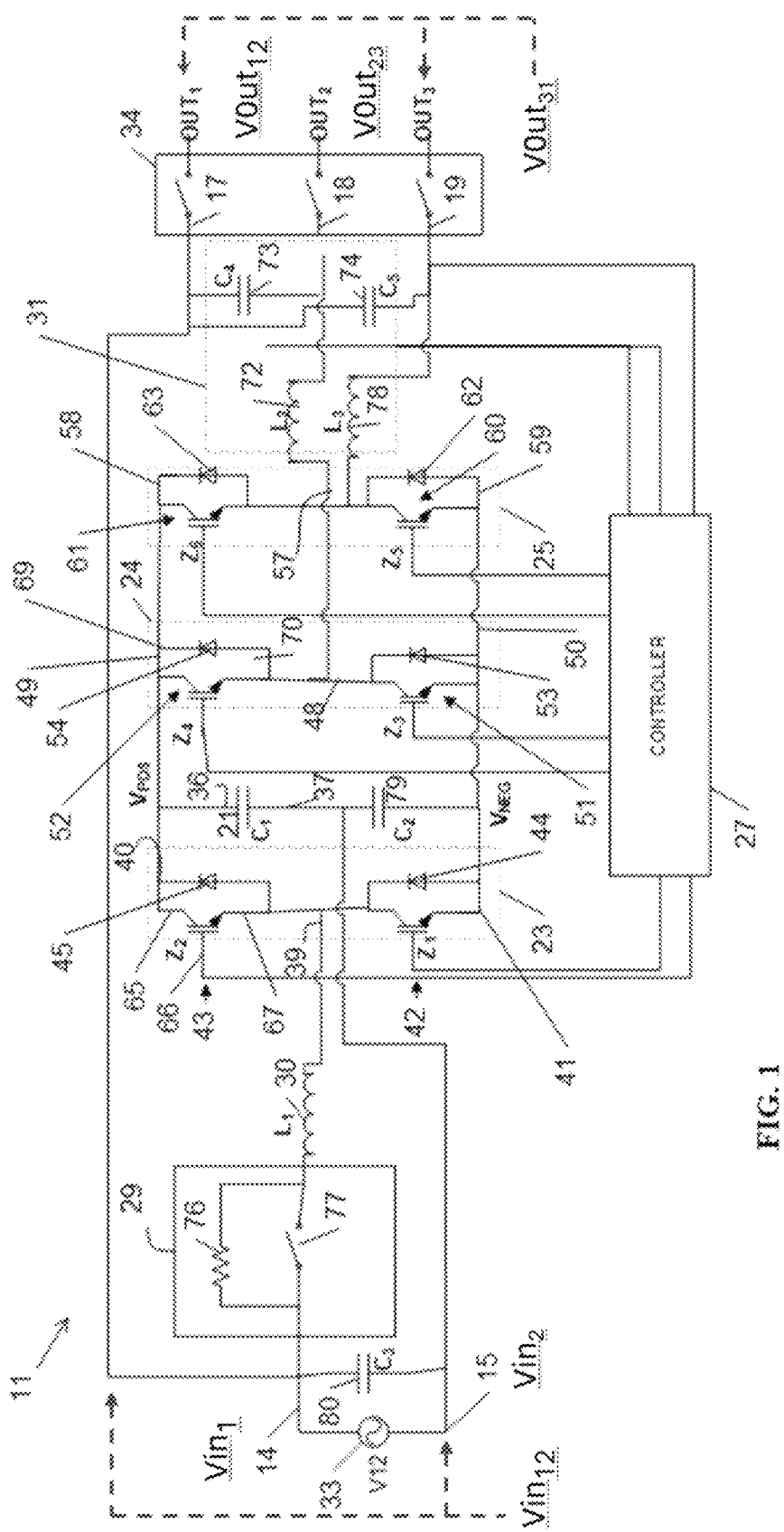
FIG. 1 is a schematic circuit diagram of a phase converter illustrating the features of on one embodiment of the present invention.

Referring to FIG. 1, a phase converter 11 includes first and second input terminals 14 and 15, first, second and third output terminals 17, 18, and 19, storage capacitors 21, and 79, active half-bridge first, second and third modules 23, 24 and 25, and a controller 27. The converter 11 also includes a precharging circuit 29, an input inductor 30, and an output filter 31.

The first and second input terminals 14 and 15 connect to a single electrical phase alternating current (AC) voltage source 33, such as a socket or two terminals connected to a utility company step-down transformer. In the illustrated embodiment, the voltage between first and second input terminals 14 and 15 may be 240 VAC. Other voltages are suitable. The first, second, and third output terminals 17, 18, and 19 are connected to a 34 that can be connected to a three-phase load.

The first input terminal connects 14 directly to the first output terminal 17. The precharging circuit 29 connects to the first input terminal 14. The input inductor 30 connects to the precharging circuit 29, opposite the first input terminal 14.

The first module 23 includes an AC terminal 39, a positive terminal 40, a negative terminal 41, the first and second switches 42 and 43, and the first and second diodes 44 and 45. The AC terminal 39 connects to the input inductor 30, opposite the precharging circuit 29. The positive terminal 40 connects to the positive end 36 of the storage capacitor 21. The negative terminal 41 connects to the negative end 37 of the storage capacitor 21.

The second input terminal 15 is connected to the common point of 37 of the capacitor 21 and capacitor 79. The second module 24, includes an AC terminal 48, a positive terminal 52, a negative terminal 50, the first and second switches 51 and 52, and the first and second diodes 53 and 54. The AC terminal 48 connects to inductor 72 of the output filter 31. The positive terminal 49 connects to the positive end 36 of the storage capacitor 21. The negative terminal 50 connects to the negative end of the storage capacitor 79.

The third module 25, includes an AC terminal 57, a positive terminal 58, a negative terminal 59, first and second switches 60 and 61, and first and second diodes 62 and 63. The AC terminal 57 connects to the third output terminal, 19. The positive terminal 58 connects to the positive end 36 of the storage capacitor 21. The negative terminal 59 connects to the negative end of the storage capacitor 79.

The first switches 42, 51, and 60 and second switches 43, 52, and 61 of the first, second, and third modules 23, 24, and 25 are preferably solid-state switches and, more preferably, Insulated Gate Bipolar Transistors (IGBT). The first switches 42, 51, and 60, and the second switches 43, 52, and 61 of the first, second, and third modules 23, 24, and 25 each have a collector 65, a base 66, and an emitter 67. The collectors 65 of the first switches 42, 51, and 60 of the first, second, and third modules 23, 24, and 25 and the emitters 67 of the second switches 43, 52, and 61 of the first, second, and third modules 23, 24 and 25 connect to the respective AC terminals 39, 48 and 57 of the first, second and third modules 23, 24 and 25.

The collectors 65 of the second switches 43, 52, and 61 of the first, second, and third modules 23, 24, and 25 connect to the respective positive terminals 40, 49, and 58 of the first, second, and third modules 23, 24 and 25. The emitters 67 of the first switches 42, 51, and 60 of the first, second, and third modules 23, 24, and 25 connect to the respective negative terminals 41, 50, and 59 of the first, second, and third modules 23, 24 and 25. The bases 66 of the first switches 42, 51, and 60 and the second switches 43, 52, and 61 of the first, second, and third modules 23, 24, and 25 connect to the controller 27.

The first diodes 44, 53, and 62 and second diodes 45, 54, and 63 of the first, second, and third modules 23, 24, and 25 each have a cathode 69 and an anode 70. The cathodes 69 of the first diodes 44, 53, and 62 of the first, second, and third modules 23, 24, and 25 and the anodes 70 of the second diodes 45, 54, and 63 of the first, second, and third modules 23, 24 and 25 connect to the respective AC terminals 39, 48 and 57 of the first, second and third modules 23, 24 and 25. The cathodes 69 of the second diodes 45, 54, and 63 of the first, second, and third modules 23, 24, and 25 connect to the respective positive terminals 40, 49, and 58 of the first, second, and third modules 23, 24 and 25. The anodes 70 of the first diodes 44, 53, and 62 of the first, second, and third modules 23, 24, and 25 connect to the respective negative terminals 41, 50, and 59 of the first, second, and third modules 23, 24 and 25.

The output filter 31 includes a filter inductor 72 connected between the AC terminal 48 of the second module 24 and the second output terminal 18, a first filter capacitor 73 connected between the first and second output terminals 17 and 18. The filter inductor 78 is connected between the AC terminal 57 of the third module 25 and the third output terminal 19, a second filter capacitor 74 is connected between the second and third output terminals 18 and 19. The precharging circuit 29 has a resistor 76 and a switch 77 connected in parallel between the first input terminal 14 and the input inductor 30. The switch 77 is preferably a contactor. When power is applied to converter 11, switch 77 is open, and the resistor 76 limits current to avoid excessively high input current. After the storage capacitor, 21 is charged, switch 77 is closed to bypass the resistor 76.

The first module, 23, charges the storage capacitors 21 and 79. The controller 27 drives the first and second switches 42 and 43 of the first module 23 to maintain a selected voltage on the storage capacitor 21. Proportional integral (PI) control is used to regulate the DC voltage $V_{dc}$ to the reference value $V_{dc}^*$. The DC reference voltage must be higher than or equal to the magnitude of the AC source 33 peak voltage for satisfactory operation of the converter 11. The current command amplitude $I_m$ for converter 11 can be presented by:

$$I_m = K_p(V_{dc}^* - V_{dc}) + K_1 \int (V_{dc}^* - V_{dc}) dt$$

where $K_p$ is the proportional gain constant and $K_1$ is the integral gain constant of the PI control.

In order to achieve unity power factor, the converter current command $i_f^*$ is constrained as follows $$i_f^* = \sin \omega t$$

where $\omega$ is the input angular frequency and is calculated by using a Phase Locked Loop (PLL).

The second and third modules 24 and 25 generate the second phase voltage $V_{23}$ and the resultant third phase voltage $V_{31}$. The controller 27 drives the first and second switches 51, 52, 60, and 61 of the second and third modules 24 and 25 to generate the voltages $V_{OUT12}$, $V_{OUT23}$, and $V_{OUT31}$, which is double in magnitude to the input voltage $V_{12}$ from the AC source 33 and 120° out of phase with respect to each other. For example, if the input voltage V12 is 240 Volts, then each of $V_{OUT12}$, $V_{OUT23}$, and $V_{OUT31}$ is 480 Volts, and each of the output voltages has a phase offset by 120 degrees. In this way a single phase input of 240 volts results in a three phase 480 Volt output. It will be appreciated that other input voltages may be used.

Figure 2:
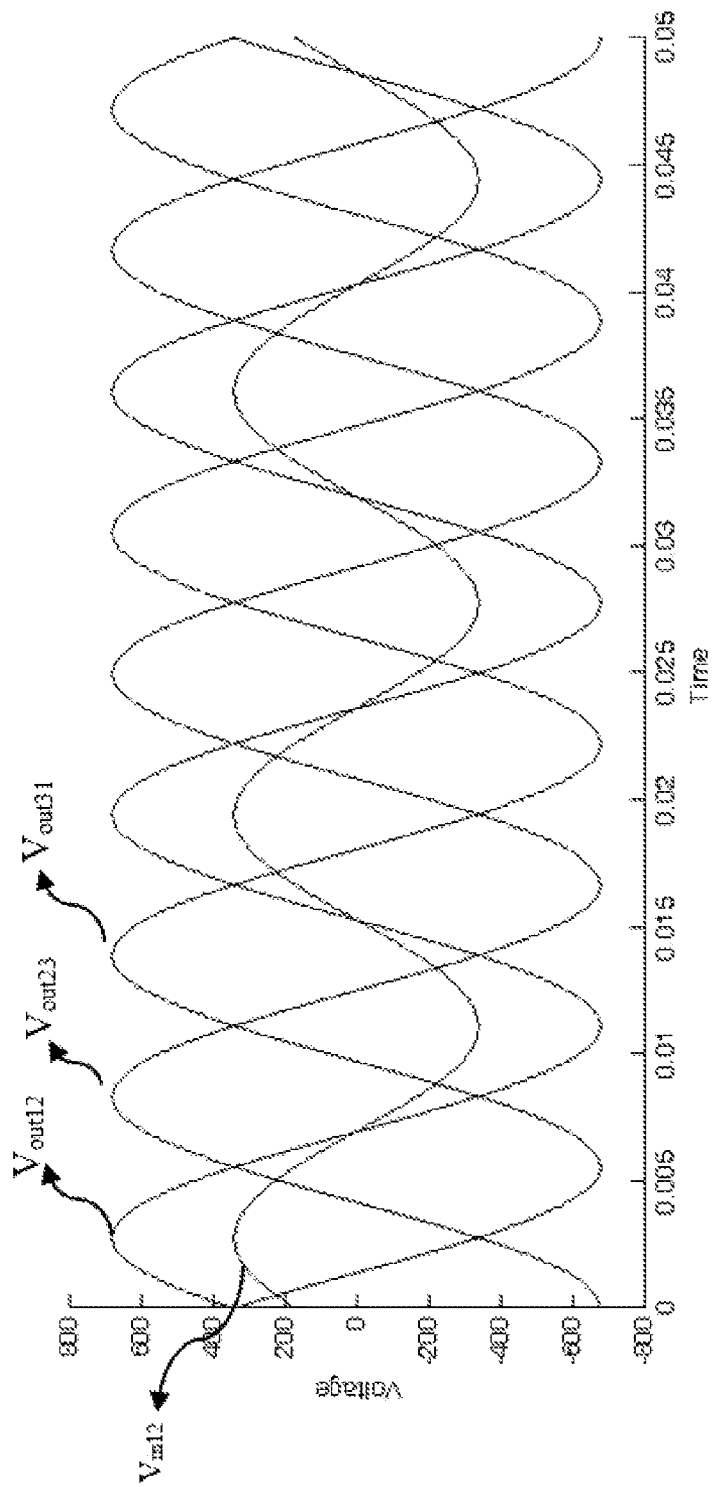
FIG. 2 is a graphical representation of the output voltages of the phase converter of the phase convertor illustrated in FIG. 1.

FIG. 2 shows the output voltages of the converter 11. In the following description, the first switch 51 of the second module 24 is Z3, the second switch 52 of the second module 24 is Z4, the first switch 60 of the third module 25 is Z5, and the second switch 61 of the third module 25 is Z6. Controller 27 drives the switches 42 and 43 to produce a pulse width modulated signal at input 39 that has an average value given by $V_{ab} = 2V_{dc}M \sin(\omega_o t)$, where M is the modulation index ($0 <= M <= 1$), $\omega_o$ is the frequency of the input voltage, and $\sin(\omega_o t)$ is the sine of the input voltage frequency. As long as the value of $V_{dc}$ is greater than the peak value of the input voltage $V_{12}$, at any instant in time the value of M can be adjusted to make $V_{ab}$ at that instant equal to, or greater than the input voltage $V_{12}$. Controller 27 drives the first and second switches 51 and 52 of the second module 24, and the first and second switches 60 and 61 of the third module 25 to generate PWM voltages. These PWM voltages at 48 and at 57 are 120° out of phase with respect to $V_{12}$ voltage. The output filter 31 converts the PWM signals at the AC terminals 48 and 57 of the second and third modules 24 and 25 to a pure sine wave.

Although the present invention has been described with a certain degree of particularity, it is understood that the present disclosure has been made by way of example and that changes in details of structure may be made without departing from the spirit thereof.

What is claimed is:

1. A voltage doubling power converter for converting a single-phase input signal to a three-phase power output signal, comprising:
   a single-phase input having a $V_{in1}$ and a $V_{in2}$ and having a voltage differential $Vin_{12}$;
   a plurality of storage capacitors connected in series;
   a plurality of switching modules, each of the plurality of switching modules having a pair of solid-state switching transistors, the plurality of switching module connected in parallel to the plurality of storage capacitors;
   a controller activating the solid-state transistors to generate a three-phase output;
   a three-phase power output having a $Vout_{12}$, a $Vout_{23}$, and a $Vout_{31}$, each at about double $Vin_{12}$, and 120 degrees out of phase with each other; and
   wherein the plurality of switching modules charge the plurality of storage capacitors to about three times $Vin_{12}$.

2. The voltage doubling power converter according to claim 1, wherein the plurality of storage capacitors is a pair of storage capacitors connected in series and having a tap between the pair of capacitors.

3. The voltage doubling power converter according to claim 2, wherein one of $V_{in1}$ or $V_{in2}$ is connected to the tap between the pair of capacitors.

4. The voltage doubling power converter according to claim 3, wherein the other one of $V_{in1}$ or $V_{in2}$ is connected to one of $Vout_{12}$, $Vout_{23}$, or $Vout_{31}$.

5. The voltage doubling power converter according to claim 1, wherein the controller uses pulse width modulation to activate the pairs of solid-state transistors.

6. The voltage doubling power converter according to claim 1, wherein the processor controls the plurality of switching modules such that a DC voltage across the plurality of charging capacitors is maintained to be approximately triple the peak voltage of $Vin_{12}$.

7. The voltage doubling power converter according to claim 1, wherein $V_{in1}$ connects directly to one output of the three-phase power output, such that $V_{in1} = Vout_{12}$, and $Vout_{23}$, and $Vout_{31}$ are generated by the plurality of switching modules.

8. The voltage doubling power converter according to claim 1, wherein the output signals for the second and third output ports are shaped according to equation) $Vout_{12} = Vm*\sin(\omega t+120°)$, $V_{out23} = Vm*\sin(\omega t-120°)$, where Vm is the required output voltage, and $\omega t$ is the phase angle of $Vin_{12}$.

9. The voltage doubling power converter according to claim 1, wherein the plurality of switching modules includes a first switching module; and
wherein the controller implements a step of controlling the first switching module to charge the plurality of storage capacitors.

10. The voltage doubling power converter according to claim 1, wherein the controller drives a pair of switching transistors in the first switching module to maintain about three times $Vin_{12}$ on the storage capacitors connected in parallel to the first switching module.

11. The voltage doubling power converter according to claim 1, wherein the plurality of switching modules comprise a first switching module, a second switching module, and a third switching module, wherein the first switching module is a charging module for the plurality of storage capacitors, and the second switching module and the third switching module define the shape for two of the three three-phase outputs.

12. A voltage doubling power converter for converting a single-phase input signal to a three-phase power output signal, comprising:
   a single-phase input having a $V_{in1}$ and a $V_{in2}$ and having a voltage differential $Vin_{12}$;
   three output ports for the three-phase power output signal having a $Vout_{12}$, a $Vout_{23}$, and a $Vout_{31}$, each at about double $Vin_{12}$, and 120 degrees out of phase with each other;
   $V_{in1}$ input coupled directly to one of the three output ports;
   a plurality of charging capacitors;
   a first switching module that is a charging module coupled to the single-phase input for maintaining a target voltage across the plurality of charging capacitors;
   a second switching module coupled to the plurality of charging capacitors;
   a third switching module coupled to the plurality of charging capacitors; and
   a controller for controlling the charging and switching modules, the controller implementing a step of:
   controlling the charging module to charge the plurality of charging capacitors to maintain the target voltage at about triple the voltage of $Vin_{12}$.

13. The voltage doubling power converter, according to claim 12, wherein the controller controls one of the second switching module and the third switching module that shape the output signal for the third output port and controls the other one of the second switching module and the third switching modules to set a polarity of the shaped output signal.

14. The voltage doubling power converter according to claim 12, wherein the output signals for the second and third output ports are shaped according to equation) $Vout_{12} = Vm*\sin(\omega t+120°)$, $Vout_{23} = Vm*\sin(\omega t)-120°)$, where Vm is the required output voltage, and $\omega t$ is the phase angle of $Vin_{12}$.

15. The voltage doubling power converter, according to claim 12, wherein the second switching module and the third switching module each have a pair of switching transistors.

16. The voltage doubling power converter, according to claim 12, wherein the controller controls the charging module such that a DC voltage across the plurality of charging capacitor is maintained to be approximately triple the peak voltage across the single-phase input.

17. A voltage doubling power converter for converting a single-phase input signal to a three-phase power output signal, comprising:
   a single-phase input having a $V_{in1}$ and a $V_{in2}$ and having a voltage differential $Vin_{12}$;

a three-phase power output having a $Vout_1$, a $Vout_2$, and a $Vout_3$, each at about double $Vin_{12}$, and 120 degrees out of phase with each other;

a pair of storage capacitors connected in series;

a charging module for maintaining a target voltage across the pair of storage capacitors that is about triple $Vin_{12}$;

a plurality of switching modules that define the $Vout_2$ and a $Vout_3$ outputs;

wherein $Vout_1$ is directly connected to and equal to $V_{in1}$.

18. The voltage doubling power converter according to claim 17, wherein $V_{in2}$ connects between the pair of storage capacitors.

\* \* \* \* \*